Sept. 1, 1936.   C. T. WALTER   2,052,734
MEANS FOR FORMING MEATS AND THE LIKE
Filed Dec. 17, 1931   3 Sheets-Sheet 1

Charles T. Walter
INVENTOR

WITNESS
ATTORNEY

Sept. 1, 1936.  C. T. WALTER  2,052,734
MEANS FOR FORMING MEATS AND THE LIKE
Filed Dec. 17, 1931  3 Sheets-Sheet 2

Charles T. Walter
INVENTOR

WITNESS

BY
ATTORNEY

Sept. 1, 1936.                C. T. WALTER                2,052,734
           MEANS FOR FORMING MEATS AND THE LIKE
                  Filed Dec. 17, 1931        3 Sheets-Sheet 3

Charles T. Walter
INVENTOR

Patented Sept. 1, 1936

2,052,734

UNITED STATES PATENT OFFICE 2,052,734

MEANS FOR FORMING MEATS AND THE LIKE

Charles T. Walter, Chicago, Ill., assignor to Swift and Company, Chicago, Ill., a corporation of Illinois Application December 17, 1931, Serial No. 581,675

3 Claims. (Cl. 17—32)

This invention relates to means for forming packaged perishable products of a form and size adaptable to sell to consumers, especially such products as stew, hamburger steak, etc.

This application is a division of my co-pending application entitled "Methods and means for forming meats and the like", filed October 27, 1930, Serial No. 491,512.

In my co-pending application entitled "Method and means for packing meat", filed October 11, 1930, Serial No. 487,976, now Patent No. 1,950,763, dated March 13, 1934, I have described and claimed a method for the production of such products. The present invention lends itself readily to large factory operations in the production of the subject in question.

One of the objects of the present invention is to provide a device which will permit the speedy and economical preparation of such products under factory conditions, with a minimum investment in equipment. The present invention also eliminates the necessity for a large number of forms. Other objects of the invention will be apparent from the description and claims which follow.

Referring now to the drawings.

Figure 2:
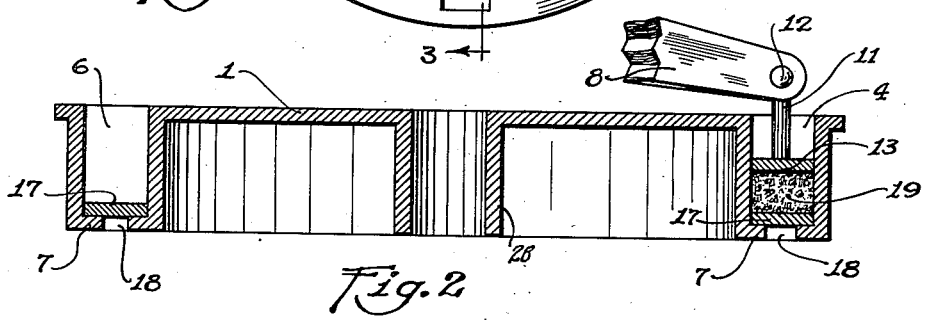
Figure 2 is a sectional view on line 2—2 of Figure 1.
Figure 3:
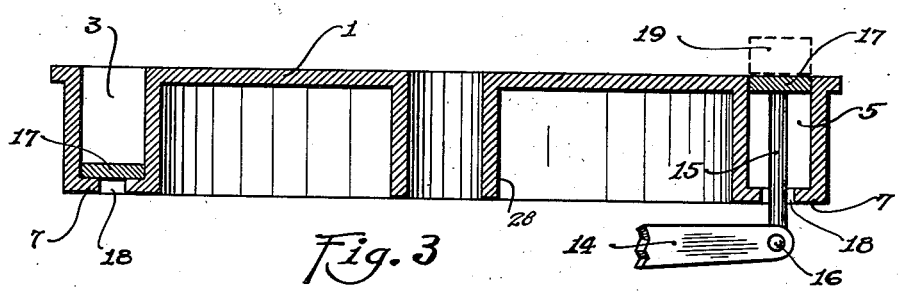
Figure 3 is a sectional view on line 3—3 of Figure 1.
Figure 4:
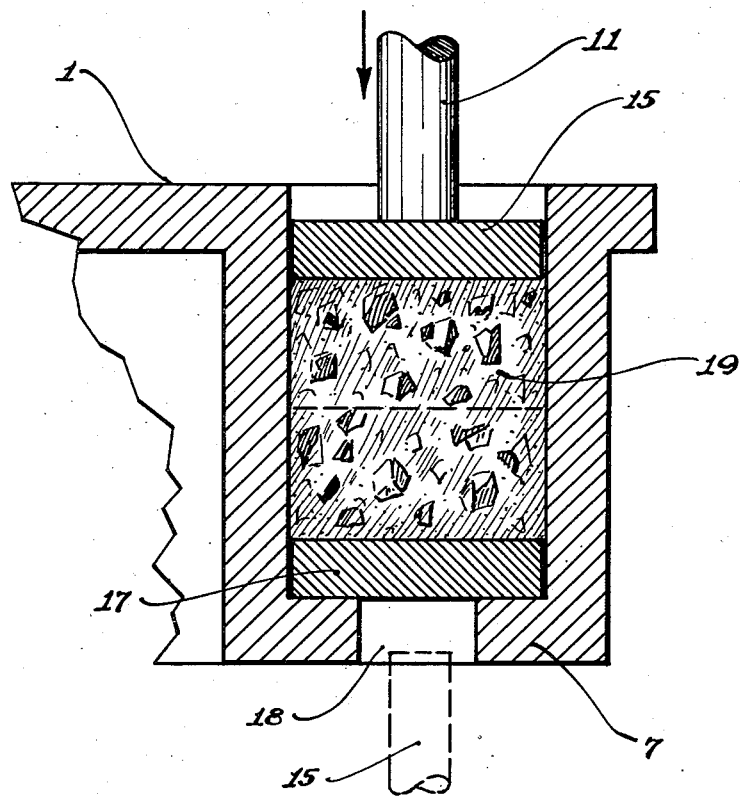
Figure 4 is a detail view of one compression unit.

The drum 1, which may be made of any appropriate material, but preferably of metal to permit easy cleaning, is axially mounted at 2 and revolves in a horizontal path about its vertically extending axis in the direction of the arrows. Drum 1 is preferably about six inches deep and is provided with compression boxes or receiving or pressing openings 3, 4, 5 and 6, each of which is provided at the bottom with a flange as 7 integral with the side walls thereof. The several compression boxes or receiving and compressing openings—sometimes referred to as recessed portions—are symmetrically arranged and are spaced equal radial distances from the vertical axis about which the drum rotates so as to successively move to and from the place whereat a pressing or compressing operation is carried out as will more fully appear. The bar 8, which serves as a presser bar, is mounted on and pivoted to the arm or member 10 by bolt 50. The rod 11 shown in Figure 2 is mounted to the presser bar 8 at 12 and is provided with presser plate 13. The bar 14 shown in Figure 3 serves to actuate an ejector rod and is powered by appropriate means. The rod 15 is mounted to the bar 14 at 16 and is provided with plate 17. The rod 15 serves as an ejector rod and passes through opening 18 which is defined by the flange 7, and when the end 16 thereof is moved upwardly, it raises the plate 17, which then serves as an ejector plate.

Figure 1:
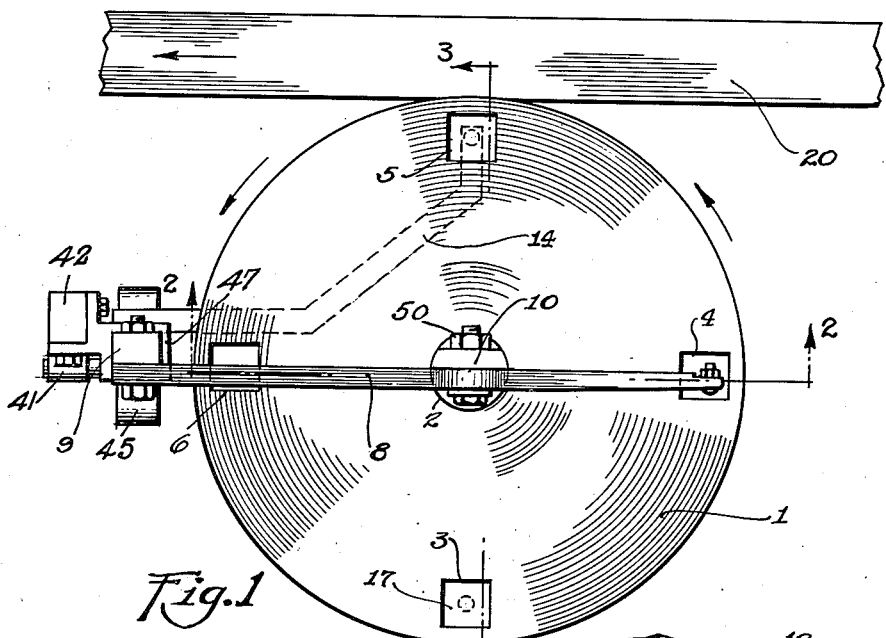
Figure 1 is a plan view of an appropriate device for economically producing a product.

Referring to Figure 1: The plate 17 is flush with the flange 7 when the compression box is at the position of 3. At this point a sufficient quantity of the frozen comminuted product is placed in the compression box, which then moves to the position of compression box 4 when the power transmitted from the ram 9 through the presser bar 8 is applied to the product by the presser plate 13 compressing the product. The compression box then moves to the position of 5, at which point plate 17 is propelled upwardly by mechanical force applied through ejector rod 15 pushing the product 19 upwardly into the position shown in dotted lines in Figure 3. The product is passed to conveyor 20 by manual operation or other appropriate means, the compression box passing through the position of box 6 to position of box 3 where it is again filled.

Figure 6:
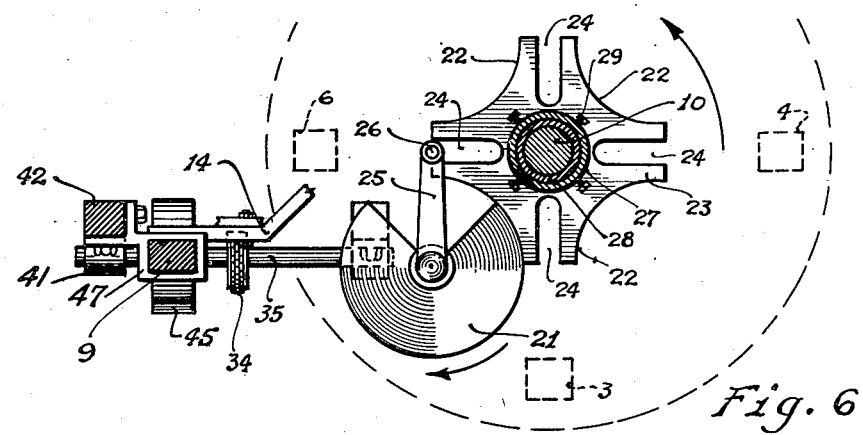
Figure 6 is a view partly in section on line 6—6 of Figure 5.
Figure 5:
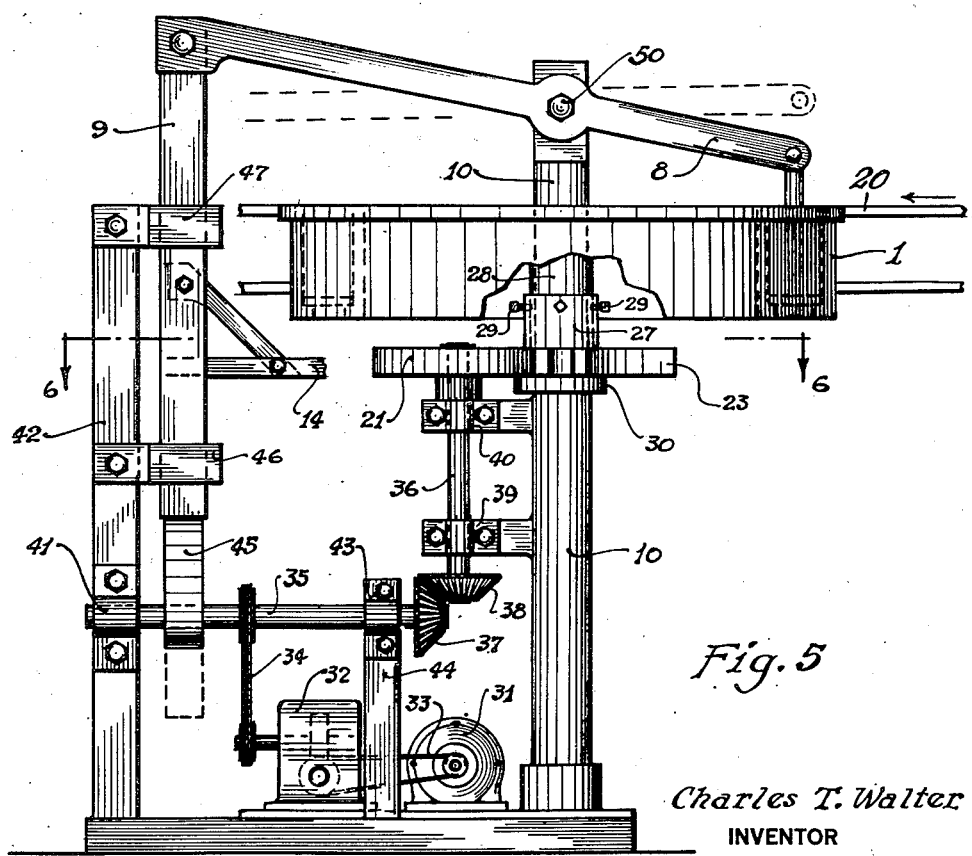
Figure 5 is a side view of the machine as a whole.

If desired, of course, the drum may be jacketed with a refrigerant. However, in practice it is equally satisfactory to construct the drum as shown in the drawings and provide the necessary refrigeration by operating the apparatus in a room maintained at the proper temperature. Any suitable means may be provided for rotating the drum and moving the other parts. In practice I prefer the simple cam means shown in Figure 6, which is operated through appropriate gears and shafts as shown in Figure 5.

The plate 21 is rotated in the direction of the arrows and as is shown is adapted to fit arcuate portions 22 of plate 23 which is also provided with four slots 24. Rotation of plate 21 causes arm 25 to travel in the same direction, drawing pin 26 into slot 24. The continued rotation drives plate 23 one quadrant to the point at which pin 26 leaves slot 24 and completes the circle to enter the next slot 24. It will be seen that during three-quarters of the revolution of plate 21 it serves to hold plate 23 in a fixed position due to bearing of its periphery in the appropriate arcuate portion 22 of plate 23.

During the time the product in compression box at position 4 is being compressed, the compressed product in the compression box at position 5 is being discharged, the compression box at position 6 is idle and the compression box at position 3 is being filled.

Plate 23 is secured to drum 1 by collar 27 fitting on sleeve 28 of drum 1 and held in position by bolts 29 and rests upon bearing plate 30 mounted upon post 10.

Power is supplied by motor 31 to gear box 32 through chain 33, thence through chain 34 to shaft 35. The cam means which operates the drum 1 is driven by shaft 36 receiving power from shaft 35 through bevel gears 37 and 38, shaft 36 being journalled in brackets 39 and 40 mounted upon post 10. Shaft 35 is journalled in bushing 41 mounted on riser 42 and in bushing 43 mounted on riser 44. Ram 9 is operated by wheel 45 which is eccentrically mounted on shaft 35 so as to act as a cam and moves in a vertical direction in collars 46 and 47 mounted upon riser 42.

If desired, the ram 9 may be actuated by hydraulic means instead of by the mechanical means shown. The means employed to actuate the ram 9 forms no part of the present invention.

In practicing the present invention, pieces of meat or other materials such as fruits or vegetables are first thoroughly frozen. The desired quantity of product is placed in the compression unit wherein it is pressed to a predetermined shape under heavy pressure, exerted by the presser plate 13. The product may be formed in any shape desired; if a cylindrical shape is desired the compression unit or box will be of cylindrical shape. It is important to maintain the compression cylinder and the piston at a temperature approximating the temperature of the frozen product, to prevent the frozen material, which comes in contact with the inside surface of the cylinder and piston, from absorbing heat and thereby becoming thawed. If the product is permitted to thaw during the operation, it becomes soft and will readily flow through the small clearance openings necessary in the working parts of the equipment. Where heavy pressure is used, meat substances, for example, will be squirted through the small clearance spaces like water. Keeping the apparatus well below the freezing point of the product prevents a leakage of the product from the compression cylinder in this manner, and makes practical the use of reasonable clearances between the working parts of the apparatus.

I have found a very satisfactory mechanical pressure to be 10,000 pounds to the square inch. This pressure is sufficient to compress meat cakes sufficiently hard to enable them to withstand subsequent storage in a freezer carried at a temperature of from zero to 15° below zero Fahrenheit, and permit the formation of meat cakes from material processed at any temperature ranging from 26° above to 9° below zero Fahrenheit, to wit, to a temperature which is down to and below the freezing point of water, and which temperature limits represent a very satisfactory commercial range.

The product need be subjected to this pressure for only a very short period of time. After the pressure is relieved, the resultant cake can be removed from the compression cylinder and handled as desired for subsequent processing. The cakes as they come from the compression device, are hard, mechanically strong, and have a highly glazed surface. To facilitate removal of formed cakes from the compression cylinders, it is desirable to have the cylinder fitted with a close fitting but removable end plate or cover, so that mechanical pressure applied to the loose cover will knock the meat cakes loose from the mold.

The application of heavy mechanical pressure to comminuted moisture-containing frozen product results in the fusing of the ice crystals within the product and the consequent formation of a coherent mass, eliminating the necessity of molds or other retaining means during the freezing of the product and permitting greater economy in production, both in the saving on the inventory of molds and in refrigeration.

Although this invention is specifically exemplified, it is to be understood that many of the details set forth may be modified or omitted without departing from the spirit of the invention as defined in the following claims.

I claim:

1. A food compression device comprising a horizontally revolving drum provided with spaced compression boxes to receive the frozen product to be compressed, means for compressing the product in one of the compression boxes when the particular compression box has been operatively positioned in respect to said means, said means comprising a bar extending across the drum and fulcrumed substantially centrally of the latter and at one end projecting beyond the drum, a rod pivotally suspended from one end of said bar, a compression plate connected to the lower end of said rod and adapted to enter the respective compression box as the boxes are successively rotated to position under the plate, a ram located at one side of the drum and operatively connected to that end of said bar which extends beyond the drum to exert power on the bar to force said plate downwardly into the respective compression box, the bottom of each compression box having a relatively small opening therein, a movable plate in the bottom of each compression box located over the opening in the latter, and an ejecting means including a bar extending at substantialy right angles to the aforesaid bar and having an element pivotally secured to one end thereof for passage through the bottom opening of the respective compression box to engage the said movable plate to lift the latter and the compressed product out of the compression box after compression and after the respective compression box has been rotated from under the aforesaid compression plate to operative position with relation to the ejecting means.

2. A food compression device comprising a revolving drum provided with spaced compression boxes to receive the product to be compressed, means for compressing the product in one of the compression boxes when the particular compression box has been operatively positioned in respect to said means which latter comprises a bar extending across the drum and fulcrumed substantially centrally of the latter, a rod pivotally connected to one end of said bar, a compression plate connected to said rod and adapted to enter the respective compression box as the boxes are successively rotated to position with relation to said plate, means located at one side of the drum and operatively connected to said bar to exert power on the bar to force said plate into the respective compression box, the bottom of each compression box having an opening therein, a plate movably mounted on the bottom of each compression box over the opening in the latter, and ejecting means including a bar on the side of the drum opposite the side on which the aforesaid bar is located and arranged at substantially a right angle to the first mentioned bar and also including an element connected to the second mentioned bar for passage through the bottom opening of the respective compression box to engage said movable plate to force said plate and the compressed product out of the compression box after compression and after the respective compression box has been rotated away from the aforesaid compressing plate to operative position with relation to the ejecting means.

3. A frozen food compression device comprising a horizontally revolving chilled drum provided with spaced chilled compression boxes to receive the frozen product to be compressed, means for compressing the frozen product in one of the compression boxes when the particular compression box has been operatively positioned in respect to said means, said compression means comprising a tiltable bar extending across the drum, a rod pivotally suspended from one end of said bar, a chilled compression plate connected to the lower end of said rod and adapted to enter the respective chilled compression box as the boxes are successively rotated to position under said plate, means operatively connected to one end of said bar to tilt the same to force said plate into the respective compression box, the bottom of each compression box having a relatively small opening therein, a chilled movable plate in the bottom of each compression box and located normally over the opening in the latter, said chilled parts of said aforesaid chilled elements being of a temperature approximating the temperature of the frozen product inserted in the compression box to prevent thawing of the latter while being compressed incident to contact with compressing parts of the device, and ejecting means including an ejecting member for passage through the bottom opening of the respective compression box to engage said chilled movable plate to lift the latter and the compressed frozen product out of the compression box after compression and after the respective compression box has been rotated from under the aforesaid compressing plate to operative position with relation to the ejecting means.

CHARLES T. WALTER.